United States Patent [19]
Lee

[11] Patent Number: 5,598,319
[45] Date of Patent: Jan. 28, 1997

[54] MAGNETIC RECORDING AND REPRODUCING APPARATUS WITH GAME PACK DRIVER

[75] Inventor: Chang Y. Lee, Kyungki-Do, Rep. of Korea

[73] Assignee: Goldstar Co., Ltd., Seoul, Rep. of Korea

[21] Appl. No.: 361,214

[22] Filed: Dec. 21, 1994

[30]       Foreign Application Priority Data

Dec. 29, 1993 [KR] Rep. of Korea ............... 30353/1993
May 9, 1994 [KR] Rep. of Korea ............... 10098/1994

[51] Int. Cl.$^6$ ............................................. H05K 7/60
[52] U.S. Cl. ..................... 361/684; 439/31; 439/131
[58] Field of Search ...................... 361/684–686; D14/124, 125, 132, 135; D21/1; 439/11, 31, 131, 928.1

[56]       References Cited

U.S. PATENT DOCUMENTS 4,763,300  8/1988  Yukawa ........................... 365/52
4,773,032  9/1988  Uehara et al. ................... 364/709.4
4,888,549  12/1989 Wilson et al. .................... 324/73.1
5,122,069  6/1992  Brownlie et al. ................ 439/131

FOREIGN PATENT DOCUMENTS

0501456A2  2/1992  European Pat. Off. ........... 273/435

*Primary Examiner*—Leo P. Picard
*Assistant Examiner*—Jayprakash N. Gandhi

[57]       ABSTRACT

A magnetic recording and reproducing apparatus with game pack driver having improved loading features. The apparatus includes a cartridge cover pivotally connected to the front panel of a main body of the apparatus which enables a game pack to be loaded even if only the front panel is exposed. In another embodiment, a block door having a game pack socket is placed in the front panel such that the block door can be linearly moved forward and backward relative to the front panel. In still another embodiment, a game pack receiving door is pivoted to the front panel, while a game pack socket is separately provided in the interior of the main body. The apparatus of the invention thus allows a game pack be loaded in the game pack driver at the front of the apparatus. The apparatus also allow a user to insert the game pack into the socket while view in the socket, thus to facilitate loading of the game pack.

19 Claims, 9 Drawing Sheets

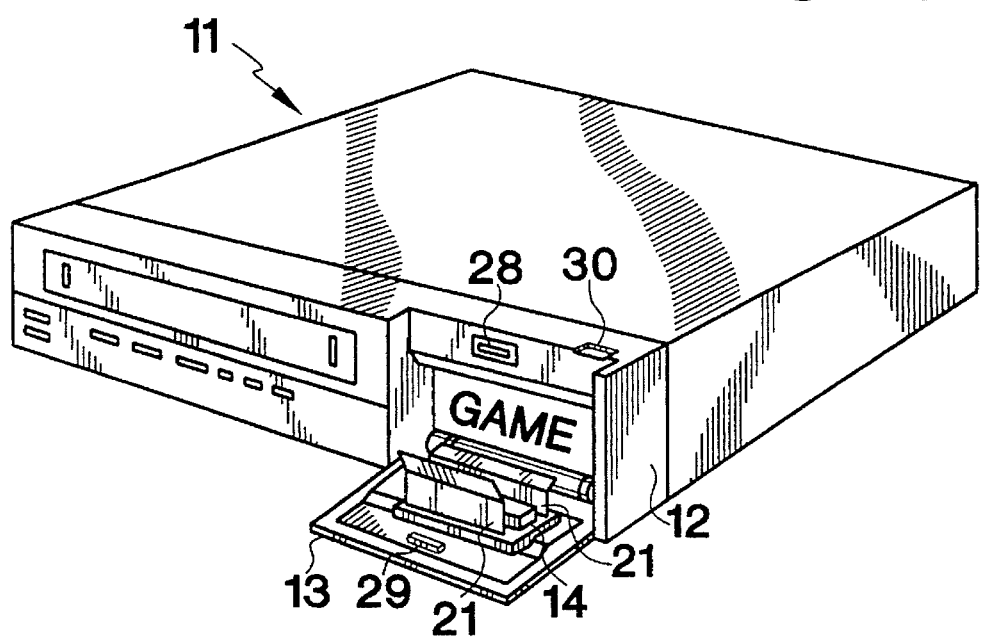
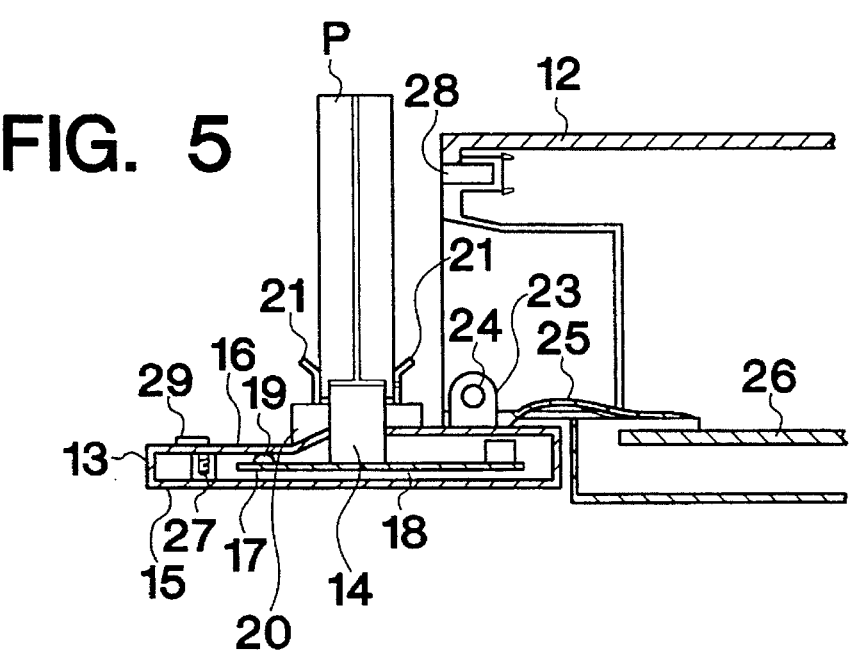

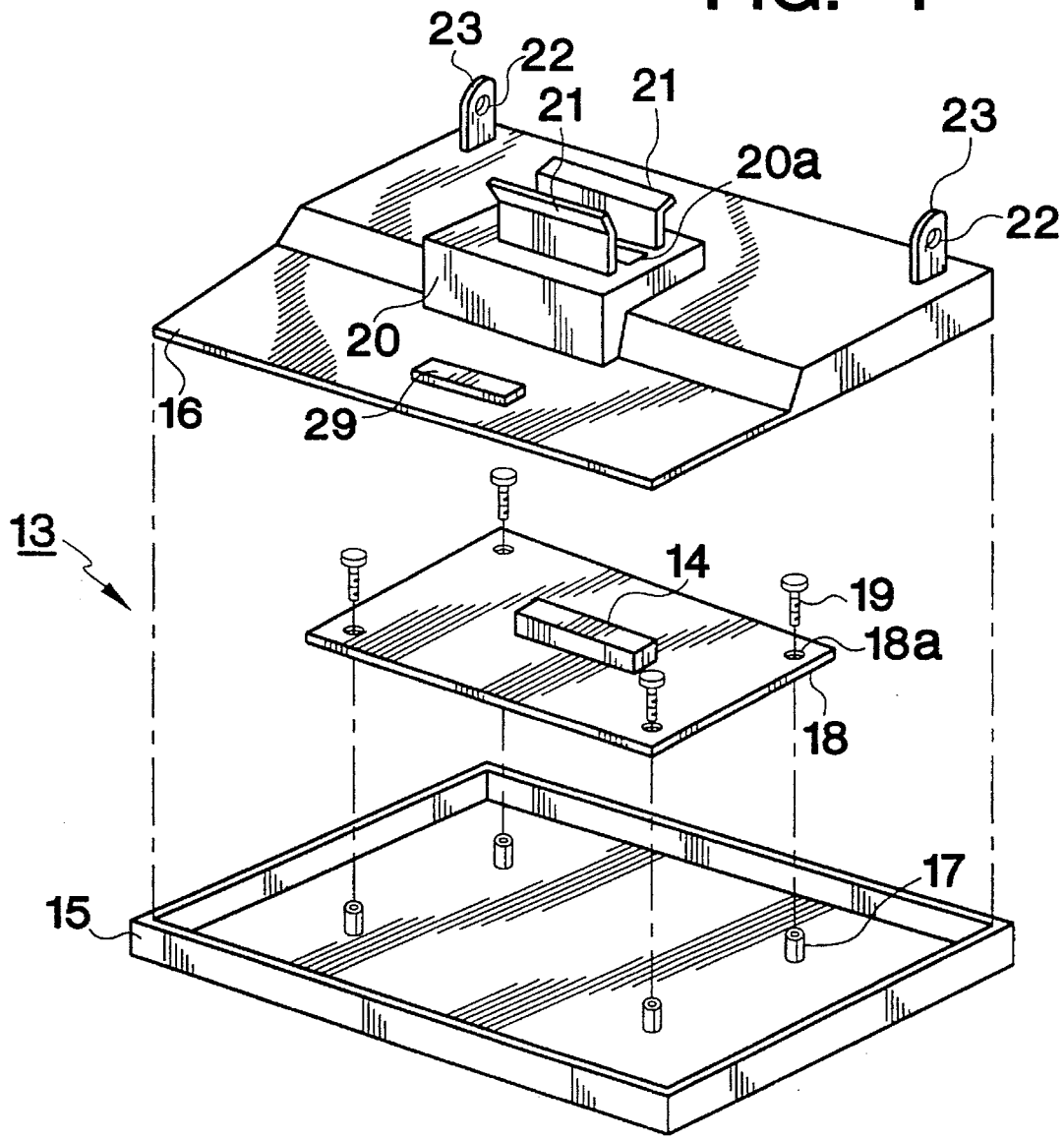

FIG. 9
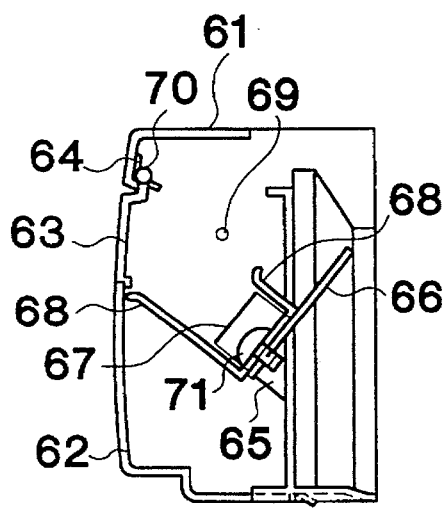
FIG. 10
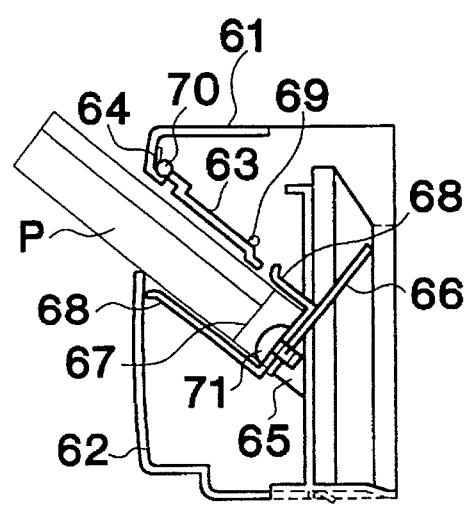
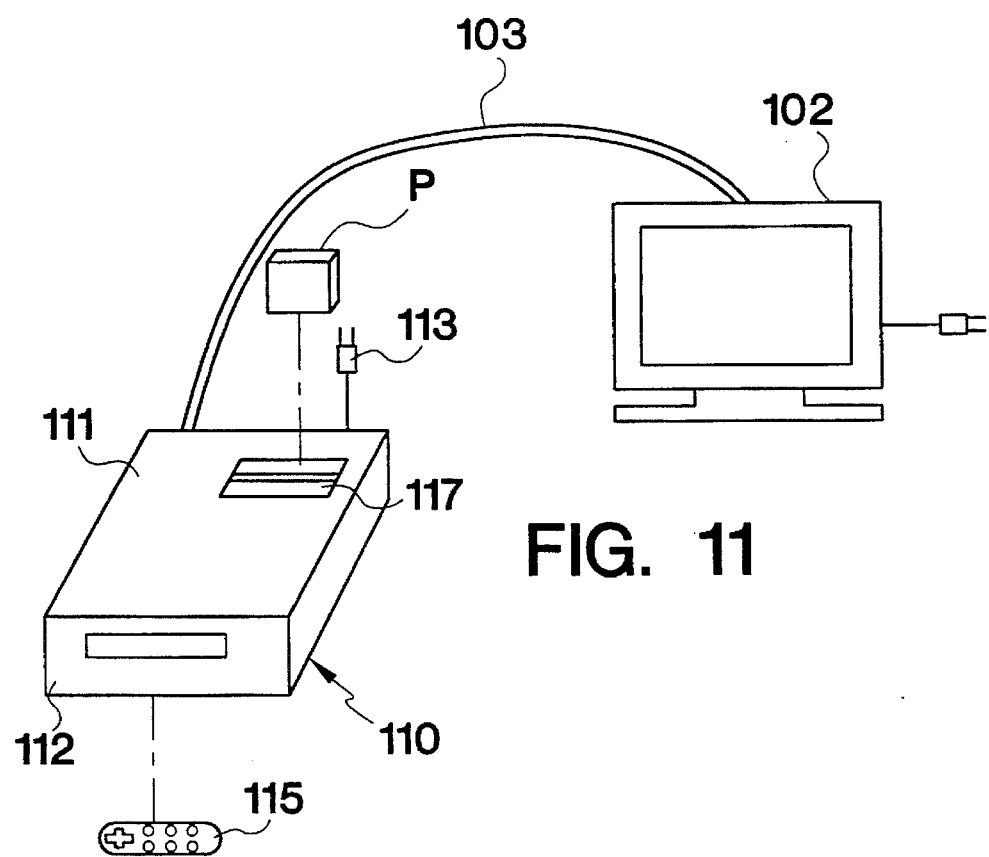
FIG. 11

MAGNETIC RECORDING AND REPRODUCING APPARATUS WITH GAME PACK DRIVER

BACKGROUND OF THE INVENTION

1. Field of the Invention

The present invention relates in general to a magnetic recording and reproducing apparatus with a game pack driver, and more particularly, to a structural improvement in the game pack drive of a magnetic recording and reproducing apparatus which provides for loading a game pack in the game pack driver at the front of the apparatus thus eliminating the need for moving the main body of the apparatus when loading the game pack in the game pack driver.

2. Description of the Prior Art

Magnetic recording and reproducing apparatus with game pack drivers have recently been wide used because the apparatus have an advantage of providing multi-functions for users at a lower cost by combining a game program drive function with its intrinsic magnetic recording and reproducing function.

Hereinbelow, a structure and an operation of a representative example of typical magnetic recording and reproducing apparatus with game pack driver will be described.

With reference to FIG. 1, there is shown a typical magnetic recording and reproducing apparatus with game pack driver. In the drawing, the reference numeral 1 denotes a main body of the apparatus. The main body 1 includes a front panel 2 and a casing 4, the front panel 2 is placed in the front section of the main body 1, and the casing 4 is integrated with the back of the front panel 2 into a single body. Provided in the rear section of the top panel 4a of the casing 4 is the game pack driver G for driving a game program of a game pack P. The game pack driver G is provided with a pair of doors 3. When enjoying a game program using the apparatus, the game pack P is loaded in the game pack driver G of the apparatus at the top of the apparatus.

However, the above magnetic recording and reproducing apparatus has the game pack driver G located in the rear section of the top panel 4a of the casing 4 as described above. This creates a problem when the main body 1 of the apparatus is placed on a shelf of a TV holder case 6, which case 6 also holds a television receiver 5 thereon so as to save the space as shown in FIG. 2.

For example, when loading (and in some cases using) the game pack P in the game pack driver G of the apparatus received in the holder case 6, the main body 1 of the apparatus must be taken from the holder case 6. After enjoying the game program, the user must return the main body 1 of the apparatus to its original position in the holder case 6. Additionally the holder case 6 should have a sufficient height for accommodating the total height of the main body 1 and the game pack P as it is loaded in the driver G.

Furthermore, since the game pack socket (not shown) of the driver G is hidden from view in the interior of the main body 1, game pack P may be accidentally or intentionally inserted into the socket by force. This may cause damage of parts of game pack driver G.

SUMMARY OF THE INVENTION

It is, therefore, an object of the present invention to provide a magnetic recording and reproducing apparatus with a game pack driver in which the above problems can be overcome and which allows a game pack to be loaded in the game pack driver at the front of the apparatus, so that there is no necessity for moving the main body of the apparatus when loading the game pack into the game pack driver.

It is another object of the present invention to provide a magnetic recording and reproducing apparatus with a game pack driver which lets the game pack be more easily loaded in the game pack driver.

In accordance with a prefferred embodiment, the present invention provides a magnetic recording and reproducing apparatus with game pack driver, wherein the game pack driver comprises a cartridge cover having a game pack socket, which cartridge cover is pivotally connected to a front panel of a main body of the apparatus such that the cartridge cover can be turned relative to the front panel so as to be opened and closed.

In accordance with another preferred embodiment, the game pack driver comprises a block door having a game pack socket, which block door is placed in a front panel of a main body of the apparatus such that the block door can be linearly moved forward and backward relative to the front panel.

In accordance with a further preferred embodiment, the game pack driver comprises a game pack receiving door pivotally connected to a front panel of a main body of the apparatus such that the door can be turned relative to the front panel; and a game pack socket provided in a predetermined position of the interior of the main body, whereby a game pack is received in the game pack socket through the game pack receiving door.

BRIEF DESCRIPTION OF THE DRAWINGS

The above and other objects, features and other advantages of the present invention will be more clearly understood from the following detailed description taken in conjunction with the accompanying drawings, in which:

FIG. 3 is a perspective view of a magnetic recording and reproducing apparatus with game pack driver in accordance with a primary preferred embodiment of the present invention;

FIG. 4 is an exploded perspective view of the game pack driver of the apparatus of FIG. 3;

FIG. 5 is a sectional view of the magnetic recording and reproducing apparatus of FIG. 3 with a game pack loaded in the game pack driver;

FIGS. 7 and 8 show states of the game pack driver with respect to the main body of the apparatus of FIG. 6, respectively, in which:

FIG. 7 shows a closed state of the game pack driver when received in the main body of the apparatus; and FIG. 8 shows an open state of the game pack driver ejected from the main body of the apparatus in preparation for loading a game pack therein;

FIGS. 9 and 10 show states of the game pack driver of a magnetic recording and reproducing apparatus with game pack driver in accordance with a third preferred embodiment of the present invention respectively, in which:

FIG. 9 shows a state of an empty game pack driver; and

FIG. 10 shows a state of the game pack driver once loaded with a game pack;

FIG. 11 is a schematic perspective view of a magnetic recording and reproducing apparatus with game pack driver in accordance with a preferred fourth embodiment of the present invention;

DESCRIPTION OF THE PREFERRED EMBODIMENTS

Figure 1:
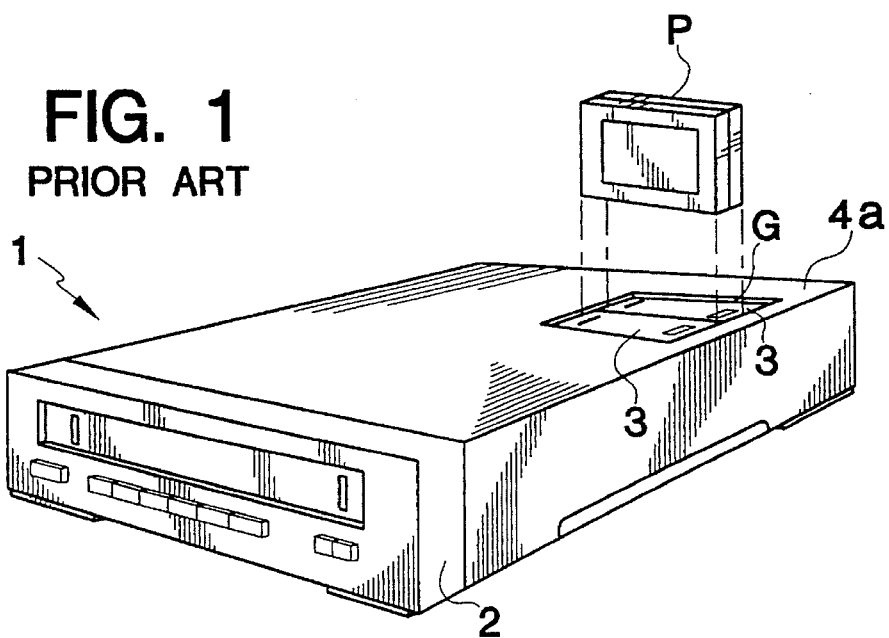
FIG. 1 is a perspective view of a conventional magnetic recording and reproducing apparatus with game pack driver.
Figure 2:
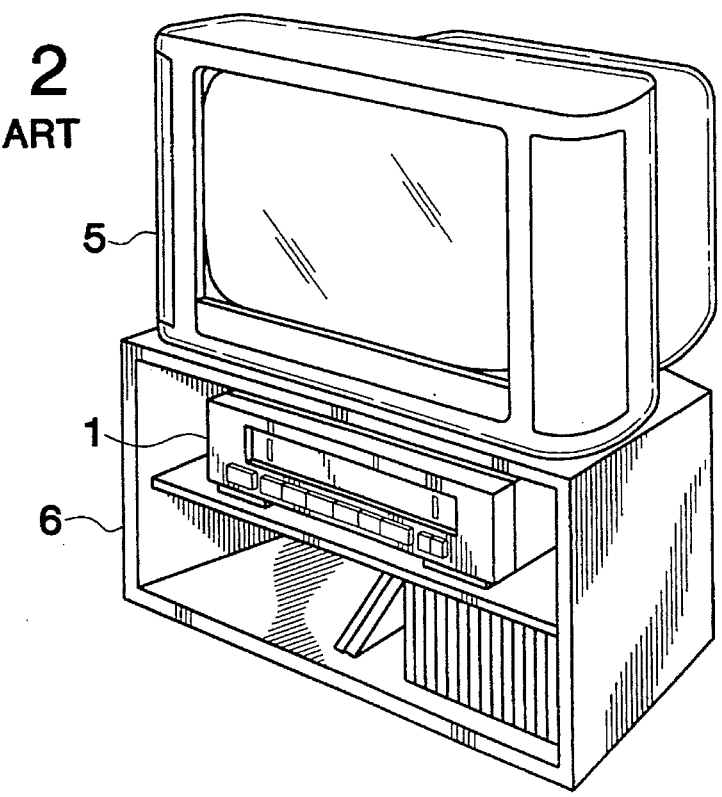
FIG. 2 is a perspective view showing a main body of the conventional apparatus of FIG. 1 received in a holder case, which holder case also holds a television receiver thereon so as to save the space.

With reference to FIG. 3, there is shown a magnetic recording and reproducing apparatus with game pack driver in accordance with a primary preferred embodiment of the present invention. In the drawing, the reference numeral 11 denotes a main body of the apparatus. The main body 11 includes a front panel 12 that is provided at the front of the main body 11. The game pack driver of the primary embodiment is provided in a side section of the front panel 12. The game pack driver of this embodiment includes an cartridge cover 13 pivotally connected to the front panel 12 and movable between open and closed position. The cartridge cover 13 is interiorly provided with a pair of guide ribs 21 for guiding and holding a game pack P (see FIG. 5). A game pack socket 14 is provided on the interior surface of the cover 13 between the two guide ribs 21.

FIG. 4 is an exploded perspective view of the game pack driver of the apparatus of FIG. 3, and FIG. 5 is a sectional view of the magnetic recording and reproducing apparatus of FIG. 3 with the game pack P loaded in the game pack driver.

As shown in the drawings, the cartridge cover 13 includes an outside member 15 of the box shape and an inside member 16, which inside member 16 is integrally coupled to the outside member 15 into a signal body and provided with a holder 20 protruding on the inner surface thereof.

The inner surface of the outside member 15 is provided with a plurality of fixing bosses 17 for fixing a rectangular first printed circuit board 18 to the outside member 15, which fixing bosses 17 are spaced at regular intervals. The printed circuit board 18 which is screwed to the fixing bosses 17 of the outside member 15 by a plurality of set screws 19 is provided with the slender socket 14 on its center portion.

In order to screw the first printed circuit board 18 to the fixing bosses 17 of the outside member 15, the rectangular circuit board 18 is provided with a plurality of screw holes 18a at its corners. When fixing the printed circuit board 18 to the fixing bosses 17 of the outside member 15, the plurality of set screws 19 are tightly screwed into their associated fixing bosses 17 through their associated screw holes 18a of the printed circuit board 18, thus to integrally couple the printed circuit board 18 to the outside member 15 into a single body.

The inside member 16 has a flat external surface and a stepped internal surface. The holder 20 is positioned on the stepped center portion of the internal surface of the inside member, so that the holder 20 has a substantially L-shaped appearance. The holder 20 is axially provided with a lengthwise opening 20a at its center, which lengthwise opening 20a has a size greater than that of the socket 14. The opposed sides of the lengthwise opening 20a are provided with guide ribs 21, which extend upward from the opposed sides of the opening 20a and slightly bent outward at their top sections. The inside member 16 is also provided with a pair of hinge protrusions 23 at or near opposing corners of the internal surface of the inside member 16, which hinge protrusions 23 have their hinge holes 22. As shown in FIG. 5, the hinge holes 22 of the hinge protrusions 23 of the inside member 16 are hinged to their associated hinge shafts 24 provided on predetermined portions of the front panel 12, thus to pivot the inside member 16 of the cartridge cover 13 to the front panel 12 of the main body 11.

A wire 25 which extends from the game pack socket 14 is connected to a second printed circuit board 26 which is fixed to a predetermined portion of the interior of the main body 11 as shown in FIG. 5. The internal surface of the inside member 16 of the cartridge cover 16 is provided with a magnet bracket 29. The front panel 12 is provided with a corresponding magnet 28 in its front top section.

With the magnet 28 of the front panel 12 and the magnet bracket 29 of the cartridge cover 13, the magnet bracket 29 is attracted and abutted to the magnet 28 of the front panel 12 when the cartridge cover 13 is closed relative to the front panel 12 after removing the game pack P from the cartridge cover 13. The magnetic attraction of the magnet 28 prevents possible sudden opening of the cartridge cover 13.

In order to facilitate ejection of the cartridge cover 13 with respect to the main body 11, the front panel 12 of the main body 11 is provided with an eject slot 30 on the top of front panel 12 above the cartridge cover 13 as shown in FIG. 3.

The operational effect of the above apparatus having the game pack driver in accordance with the primary embodiment will be described hereinbelow.

When enjoying a game program using the apparatus of the primary preferred embodiment, the cartridge cover 13 is pulled outward by handling the eject slot 30 of the front panel 12, so that the magnet bracket 29 of the cover 13 is separated from the magnet 29 of the front panel 12 and the cover 13 is turned outward about the hinge shafts 24 as shown in FIGS. 3 and 5, thus to be opened.

When the cartridge cover 13 has been completely opened with respect to the front panel 12, the socket 14 protruding out of the internal surface of the inside member 16 is horizontally positioned and exposed to the outside as shown in FIG. 5. In this state, the game pack P is inserted into the socket 14, so that the game pack P is guided by the pair of guide ribs 21 extending from the holder 20 of the inside member 16 and passes through the lengthwise opening 20a of the holder 20 and in turn precisely loaded in the socket 14.

After enjoying the game program of the game pack P, the game pack P is removed from the socket 14 and, thereafter, the cartridge cover 13 is turned about the hinge shafts 24 of the front panel 12. The magnet 28 of the front panel 12 attracts the magnet bracket 29 of the cartridge cover 13, so that the magnet bracket 29 is magnetically abutted to the magnet 28 and the cartridge cover 13 is kept in its closed state.

Figure 6:
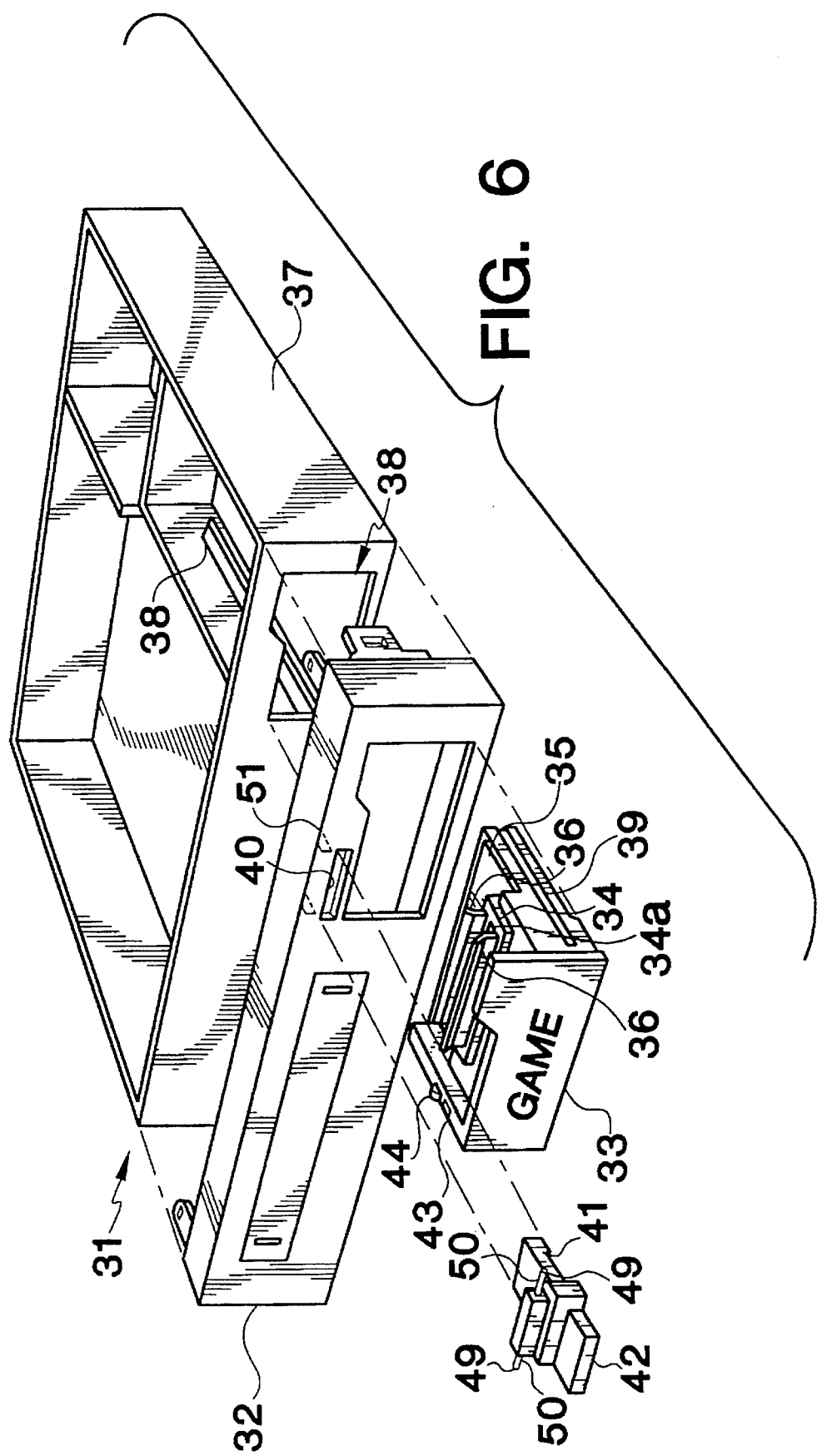
FIG. 6 is an exploded perspective view of magnetic recording and reproducing apparatus with game pack driver in accordance with a second embodiment of the present invention.
Figure 7:
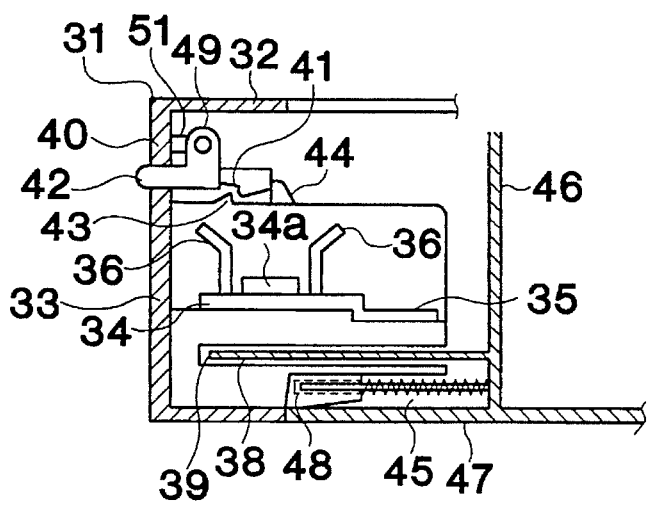
Figure 8:
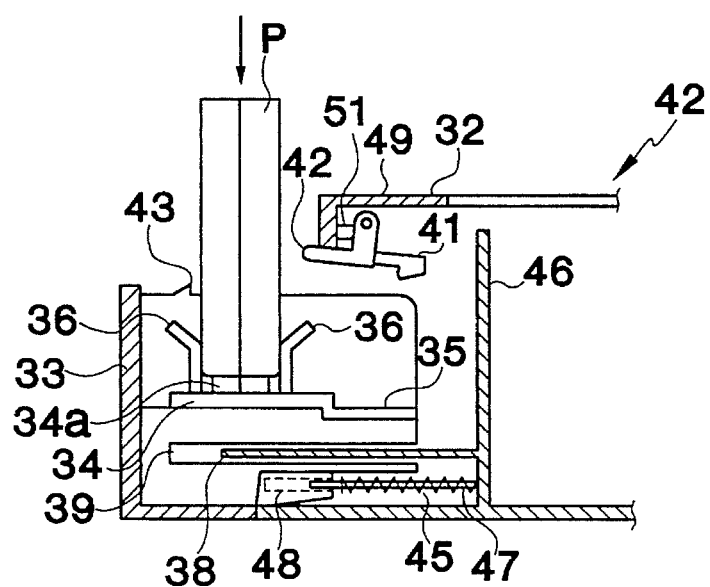

Turning to FIGS. 6 to 8, there is shown a magnetic recording and reproducing apparatus with game pack driver in accordance with a second embodiment of the present invention.

In the drawings, the reference numeral 31 denotes a main body of the apparatus. The main body 31 includes a front panel 32 placed at the front of the main body 11. The game pack driver of the second embodiment, which driver is provided in a side of the front panel 32, includes a movable block door 33. The block door 33 is placed in the side of the front panel 32, so that the block door 33 is linearly moved forward or rear ward relative to the main body 31 as shown in FIG. 8. The block door 33 is provided with a game pack socket 34a, which socket 34a will receive the game pack P as shown in FIG. 8.

The block door 33 is provided with a holder 34, which holder 34 in turn is provided with the socket 34a. A pair of guide ribs 36 for guiding smooth insertion of the game pack P into the socket 34a is provided on opposed sides of the socket 34a. The guide ribs 36 extend upward from the opposed sides of the socket 34a and slightly bent outward at their top sections.

The block door 33 of the second embodiment is installed in the main body 1 of the apparatus such that it can be linearly moved relative to the main body 1 while guided by the door guide means. As shown in FIG. 6, the door guide means includes a pair of guide rails 38 fixedly mounted to opposed inner side surfaces of a main frame 37 of the main body 31 respectively. The door guide means also includes a pair of guide grooves 39, which grooves 39 are provided on opposed side surfaces of the block door 33 and engaged with the guide rails 38 of the main frame 37. Of course, it should be understood that the construction of the door guide means is not limited to the embodiment of FIG. 6 but there exist a variety of different constructions which yield the same result as that of the construction shown in FIG. 6.

In the second embodiment, the main body 31 of the apparatus is also provided with door locking and ejecting means for locking the door 33 to the interior of the main body 31 and for ejecting the door 33 from the main body 31. The door locking and ejecting means includes a push button 42, which push button 42 is pivotally connected to the internal surface of the front panel 32 such that the front end of the button 42 partially projects out of a button hole 40 of the front panel 32. The push button 42 has a hook 41 on the bottom surface in its rear section. The door locking and ejecting means also includes a pair of protrusions, that is, a guide protrusion 43 and a stop protrusion 44, which protrusions 43 and 44 are provided on the top surface of a side wall of the block door 33 and spaced apart from each other by a predetermined distance. The protrusions 43 and 44 cooperate with the hook 41 of the rear section of the push button 42, thus to prevent sudden ejection of the block door 33. The door locking and ejecting means further includes a biasing member 45, which member 45 elastically biases forward the back of the block door 33 as shown in FIG. 7, so that the member 45 elastically biases the door 33 forward when the push button 42 is pushed so as to release the stop protrusion 44 of the door 33 from the hook 41 of the button 42.

In the second embodiment, the biasing member 45 is a compression coil spring which is fitted over a spring holder shaft 47 fixed to the internal surface of the main frame 37 of the main body 31. A predetermined portion of the rear section of the block door 33 is provided with a shaft insert hole 48 for receiving the shaft 47 with the compression coil spring 45 as shown in FIG. 7.

As shown in FIG. 6, the push button 42 is provided with a pair of hinge pins 49 on opposed sides thereof, so that the push button 42 pivots about the hinge pins 49 to a hinge boss 51 provided on the internal surface of the front panel 32. It is preferred to couple a biasing member 50 such as a torsion spring to each of the hinge pins 49, thus to elastically support the push button 42 and to let the push button 42 be always biased in a clockwise direction.

In the present invention, the moving stroke of the block door 33 may be controlled using top and bottom members (not shown) having two protrusions instead of the biasing member 45 and the shaft hole 48 of the block door 33. That is, the moving stroke of the block door 33 or the moving range of the block door 33 may be controlled using the top and bottom members having the protrusions.

The operational effect of the above apparatus having the game pack driver in accordance with the primary embodiment of the invention will be described hereinbelow.

FIG. 7 shows the second embodiment in a closed state where the block door 33 is fully received in the main body 31 of the apparatus, and FIG. 8 shows the second embodiment in an open state where the block door 33 is ejected from the main body 31 of the apparatus for loading the game pack P therein.

In the closed a state of FIG. 7, a forward biasing force of the biasing member 45 is applied to the block door 33 urging it forward from the main body 31 of the apparatus. However, the hook 41 of the rear section of the push button 42 in the closed state abuts the front surface of stop protrusion 44 of the block door 33 as shown in the drawing, thus to keep the block door 3 in the closed state irrespective of the forward biasing force of the biasing member 45.

When enjoying a game program, the push button 42 whose front end protrudes out of the button hole 40 of the front panel 32 is slightly pushed, the hook 41 of the push button 42 is separated from and releases the stop protrusion 44 of the door 33, so that the door 33 is free from the push button 42. The block door 33 is thus automatically ejected forward from the main body 31 in response to the forward biasing force of the biasing member 45 as shown in FIG. 8.

At this time, the guide grooves 39 of the block door 33 are slidably engaged with the guide rails 38 of the main body 31 as described above, so that the guide means comprising the guide grooves 39 and the guide rails 38 smoothly guides forward linear movement of the block door 33. In the present invention, it is preferred to provide lock means (not shown) on either the front panel 32 or the block door 33, thus to limit the ejecting motion of the block door 33 within a predetermined range.

When the block door 33 has been fully ejected from the main body 31, the game pack P is inserted into the socket 34a of the door 33, so that the game pack P is guided by the pair of guide ribs 36 extending from the opposed sides of the socket 34a and precisely inserted in the socket 34a.

After enjoying the game program, the game pack P is removed from the socket 34a and the block door 33 having no game pack P is pushed rearward. The block door 33 will be received in the main body 1 while compressing the biasing member 45. During the rearward linear movement of the block door 33 relative to the main body 1, the hook 41 of the push button 42 slides over the guide protrusion 43 of the door 33 and stops the front surface of the stop protrusion 44 of the door 33 just after the door 33 has been fully received in the main body 31. Therefore, the block door 33 is locked to the close state as shown in FIG. 7.

Turning to FIGS. 9 and 10, there is shown a magnetic recording and reproducing apparatus with game pack driver in accordance with a third preferred embodiment of the present invention. FIG. 9 shows a closed state of an empty game pack driver, while FIG. 10 shows a state of the game pack driver loaded with a game pack.

In the magnetic recording and reproducing apparatus with game pack driver in accordance with the third preferred embodiment, the game pack driver includes a game pack receiving door 63 which is pivotally connected to a front panel 62 of a main body 61 of the apparatus. A biasing member 64 such as a torsion spring is coupled to the rotating center of the game pack receiving door 63 so as to elastically hold the door 63 relative to the main body 1. The game pack driver also includes a printed circuit board 66 which is mounted to a base 65 provided in a predetermined portion of the interior of the main body 61. A game pack socket 67 is mounted to the printed circuit board 66. The game pack driver further includes a pair of guide ribs 68 for guiding insertion of the game pack P into the socket 67. The guide ribs 68 extends from opposed sides of the socket 67 and slight bent outward at their top sections. In the third embodiment, the guide ribs 68 may differ from each other in their sizes as shown in FIG. 9.

In the game pack driver of the third embodiment, it is preferred to incline the printed circuit board 66, the game pack socket 67 and the guide ribs 68 relative to the main body 61 an inclination angle of about 45°, thus allowing the game pack P to be inserted into the socket 67 at a predetermined inclination angle. In order to facilitate the insertion of the game pack P into the socket 67, stop means 69 for limiting the turning motion of the game pack receiving door 63 relative to the main body 61 is provided in a predetermined portion of the interior of the main body 61.

In the drawings, the reference numeral 70 denotes a hinge pin of the game pack receiving door 63 and the numeral 71 denotes a set screw for fixing the printed circuit board 66.

The operational effect of the above apparatus having the game pack driver in accordance with the third preferred embodiment of the invention will be described hereinbelow.

FIG. 9 shows the closed state of the empty game pack driver. The game pack receiving door 63 is normally kept in the close state in response to the clockwise biasing force of the biasing member 64. When enjoying a game program, the game pack P is inserted into the game pack driver while opening the door 63. When the game pack P is inserted into the game pack driver, the door 63 is turned counterclockwise about the hinge pin 70 while overcoming the biasing force of the biasing member 64, and the game pack P is precisely introduced into the socket 67 as guided by the guide ribs 68.

At this time, the pivotal motion of the game pack receiving door 63 is stopped by the stop means 69 provided at predetermined position in the interior of the main body 61. When the door 63 has been turned at predetermined turning angle, the door 63 acts as a guide for directing the insertion of the game pack P into the socket 67.

Meanwhile, when the game pack P is removed from the socket 67 of the game pack driver after enjoying the game program, the game pack receiving door 63 is automatically turned clockwise about the hinge pin 70 responsive to the restoring force of the biasing member 64, so that the door 63 is closed.

Turning to FIGS. 11 to 14, there is shown a magnetic recording and reproducing apparatus with game pack driver in accordance with a fourth preferred embodiment of the present invention.

Differently from the magnetic recording and reproducing apparatus with game pack driver according to each of the above first to third embodiments, the apparatus of the fourth embodiment is intended to be used in the case of sufficient space provided for the apparatus. That is, the apparatus of the fourth embodiment is provided with the game pack driver in the interior of a main body of the apparatus in a manner similar to that of the prior embodiment. As shown in FIG. 11, the main body 110 of the apparatus of the fourth embodiment includes a top panel 111 and a front panel 112, which front panel 112 is placed in the front of the main body 110 and provided with a plurality of function keys (not shown). The back panel 114 (see FIG. 13) of the main body 110 is provided with a power cord 113 and a plurality of input and output terminals, which power cord 113 and input and output terminals are in turn electrically connected to an interior circuit of the apparatus. A radio frequency cable 103 is electrically connected to an output terminal of the back panel 114 of the main body 110 and to a television receiver 102.

In the apparatus of the fourth embodiment, a remote controller 115 for controlling both the game pack driver and the magnetic recording and reproducing apparatus is provided for remote control of the function keys of the front panel 112 as shown in FIG. 11. The game pack driver, which is provided in the interior of the main body 110, includes a game pack slot 116. The game pack slot 116 is mounted to a bracket 119 in such a manner that the game pack slot 116 will be coupled to a terminal part 125 of a game pack P inserted into the game pack driver as shown in FIG. 12.

Figure 12:
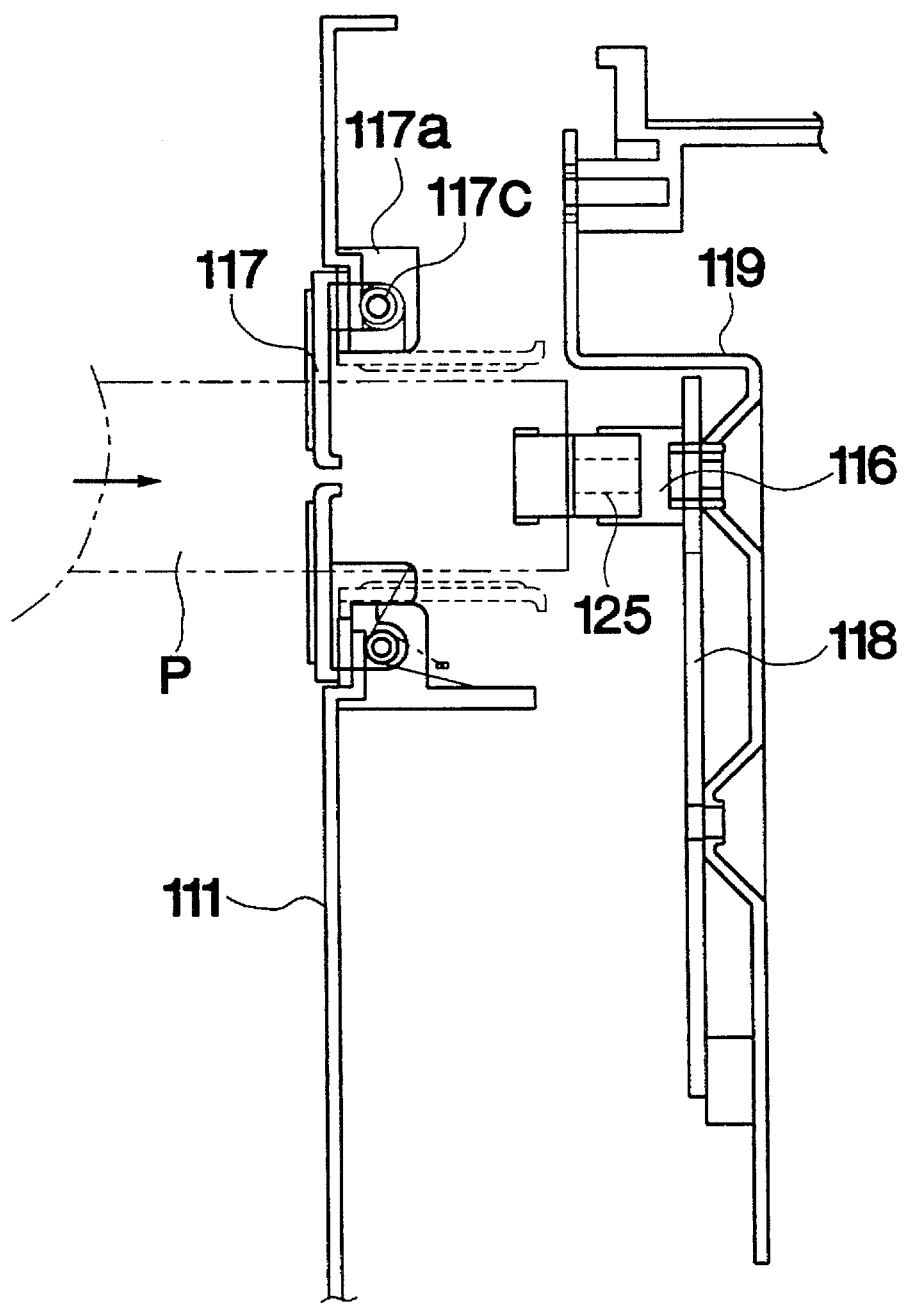
FIG. 12 is a sectional view of the game pack driver of the apparatus of FIG. 11 loaded with a game pack inserted in a game pack slot of the driver.
Figure 14:
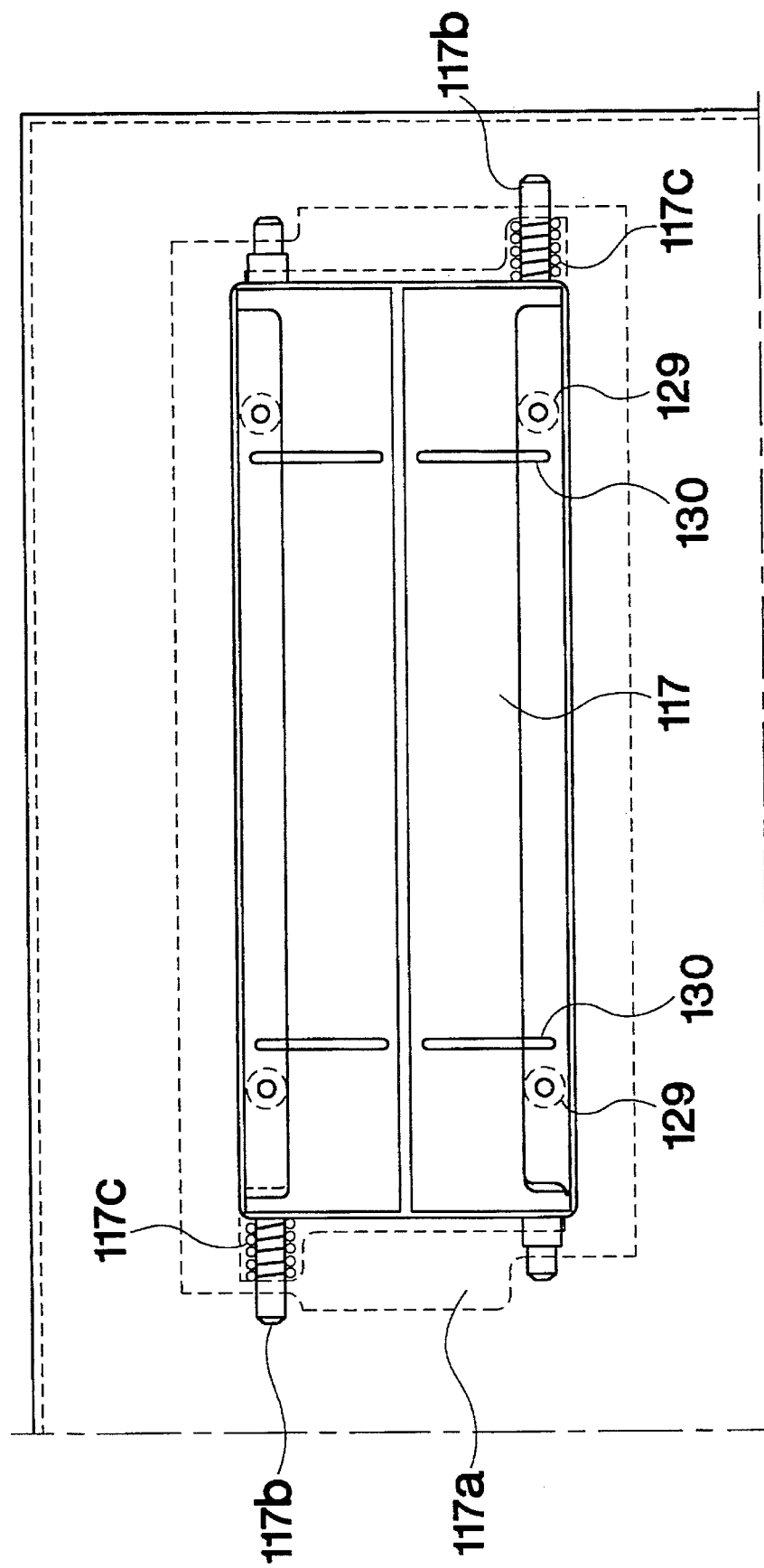
FIG. 14 is plan view of a pair of doors of the game pack driver of the apparatus of FIG. 11.

As shown in FIGS. 12 and 14, the top panel 111 of the main body 110 is provided with a pair of game pack door 117, which doors 17 are positioned vertically above the game pack slot 116. The game pack doors 117 are adapted for receiving a game pack P therethrough. Each of the game pack doors 117, which is made of either an iron plate or a synthetic resin plate, is provided on its top surface with abrasion preventing protrusions 130 as shown in FIG. 14. The protrusions 130 of each game pact door 117 are spaced at regular intervals and prevent possible frictional abrasion of each door 117 when a game pack P is inserted into the game pack driver while forcibly pushing the doors 117. Each of the game pack doors 117 is provided with hinge bosses 129 through which each game pack door 117 is pivoted to the top panel 111 of the main body as shown in FIG. 12. The opening motion of the pivoted game pack doors 117 will be described in detail later herein.

Figure 13:
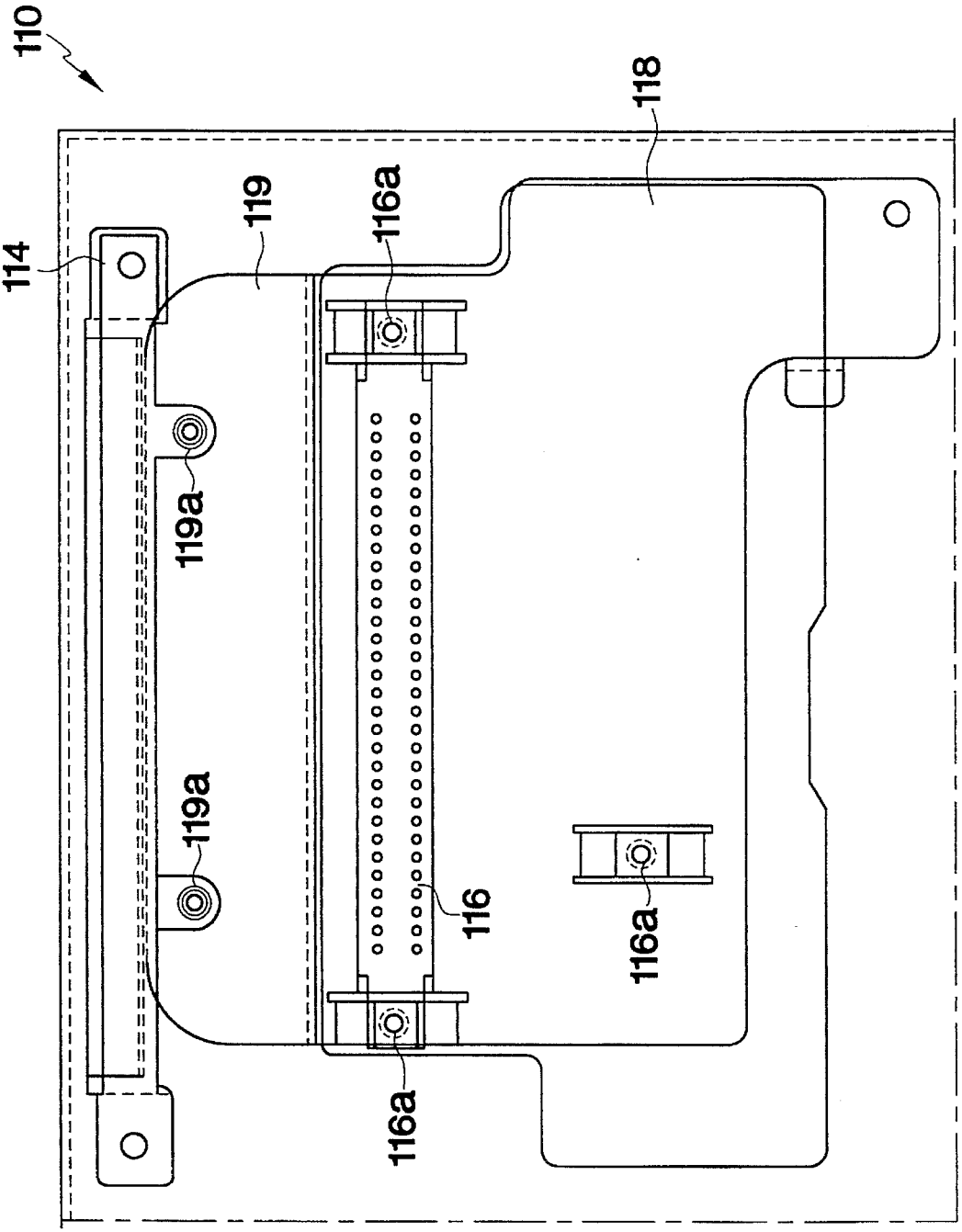
FIG. 13 is a plan view showing the game pack slot of the driver combined with the main body of the apparatus of FIG. 11.

As shown in FIGS. 12 and 13, the game pack slot 116 is fixed to a top side of a printed circuit board 118 by a plurality of set screws 116a. When fixing the game pack slot 116 to the top side of the printed circuit board 118, the set screws 116a penetrate thoroughly the printed circuit board 118 and in turn are screwed to the bracket 119 placed under the printed circuit board 118. Otherwise stated, both the game pack slot 116 and the printed circuit board 118 are fixed to the bracket 119 by the set screws 116a at a time, which bracket 119 in turn is interiorly fixed to the main body 110 by a plurality of set bosses 119a.

The printed circuit board 118, to which the bottom surface of the game pack slot 116 is mounted, is placed on the top surface of the bracket 119 as shown in FIG. 13. The printed circuit board 118 is electrically connected to the function keys of the front panel 112 and to an output terminal of the back panel 114. The game pack doors 117 of the top panel 111 of the main body 110 is pivotally connected to the top panel 111 in the following manner. That is, a door opening for placing the doors 117 therein is formed in the top panel 111 above the game pack slot 116 as shown in FIGS. 12 and 14. A pair of door holders 117a, each provided with hinge holes (not shown), are interiorly mounted to the opposed sides of the door opening of the top panel 111 as shown in FIG. 14. The doors 117, each provided with opposed hinge protrusions 117b, are pivoted to the door holders 117a by pivoting the hinge protrusions 117b of the doors 117 to the hinge holes of the door holders 117a respectively. A return spring 117c is fitted over one of the hinge protrusions 117b of each door 117, so that the return springs 117c of the doors 117 bias the doors 117 upward so as to close the doors 117 when the doors 117 are not applied with external force.

When enjoying a game program using the apparatus of the fourth embodiment, a game pack P is inserted into the game pack driver through the doors 117 provided in the top panel 111 of the main body 110. The terminal part 125 of the game pack P is thus coupled to the slot 116 of the game pack driver. When the remote controller 115 for the function keys of the front panel 112 is handled in this case, the game program of the game pack P is displayed on the television receiver 102, which television receiver 102 is electrically connected to the back panel 114 of the main body 110 through the radio frequency cable 103.

When removing the game pack P from the game pack driver after enjoying the o game program, the doors 117 biased by the return springs 117c are elastically turned upward about the hinge holes of the holders 117a due to the biasing force of the return springs 117c, thus to return to their original positions or closed positions. Therefore, the doors 117 prevent possible infiltration of foreign substances such as dust into the interior of the main body 110.

The magnetic recording and reproducing apparatus with game pack driver in accordance with the fourth embodiment of the invention is provided with the game pack driver in the interior of the main body 110 of the apparatus, thus to facilitate keeping of the game pack driver. This embodiment also needs not additionally connect the radio frequency cable 103 in use of the apparatus, thus to facilitate use of the apparatus. The game pack driver of this apparatus is covered with the game pack doors 117, which doors 117 are provided in the top panel 111 of the main body 110 and automatically closed by the return springs 117c when there is no external force applied on the doors 117. With the doors 117, the apparatus of the fourth embodiment has a good appearance.

As described above, a magnetic recording and reproducing apparatus with game pack driver in accordance with the present invention includes a cartridge cover having a game pack socket, which cartridge cover is pivotally connected to the front panel of a main body of the apparatus. In accordance with another embodiment, the game pack driver may include a block door having a game pack socket, which block door is provided in the front panel of the main body of the apparatus such that the block door can be linearly moved forward and rearward relative to the front panel. In accordance with still another embodiment, the game pack driver may include a game pack receiving door and a game pack socket, which door is pivotally connected to the front panel of the main body of the apparatus, and which socket is separately provided in the interior of the main body. The apparatus of the invention thus lets a game pack be easily loaded in the game pack driver at the front of the apparatus, so that there is no necessity for moving the main body of the apparatus, received in a TV holder case, when loading the game pack in the game pack driver. In addition, the apparatus lets a user insert the game pack into the socket of the game pack driver while viewing the socket, so that the apparatus lets the game pack be more easily loaded in the game pack driver.

Although the preferred embodiments of the present invention have been disclosed for illustrative purposes, those skilled in the an will appreciate that various modifications, additions and substitutions are possible, without departing from the scope and spirit of the invention as disclosed in the accompanying claims. For example, the present invention may be adapted to a drive device of a copying machine.

What is claimed is:

1. Magnetic recording and reproducing apparatus with game pack driver, comprising:

a main body;

a front panel connected to the main body;

a game pack receiving means located on the front panel for receiving and holding a game pack in communication with the game pack driver to provide easy loading and unloading of a game pack even when the main body other than the front panel may be otherwise confined; and said game pack receiving means including
a cartridge cover having a game pack socket, said cartridge cover being pivotally connected to the front panel of the main body such that the cartridge cover turns relative to the front panel between opened and closed positions.

2. The magnetic recording and reproducing apparatus with game pack driver according to claim 1, wherein said cartridge cover includes:

an outside member forming the outside part of the cartridge cover; and an inside member coupled to said outside member, an exposed surface of said inside member being provided with a socket holder.

3. The magnetic recording and reproducing apparatus with game pack driver according to claim 2, wherein the internal surface of said outside member is provided with a plurality of regularly spaced bosses for mounting a printed circuit board between the outside member and the inside member, said printed circuit board being mounted with said game pack socket in alignment with said socket holder.

4. The magnetic recording and reproducing apparatus with game pack driver according to claim 3, wherein said socket holder being provided with a pair of guide ribs for guiding insertion of a game pack into said game pack socket, said guide ribs extending from the exposed surface of said inner member.

5. The magnetic recording and reproducing apparatus with game pack driver according to claim 1, further comprising:

a magnet provided on a front top section of the front panel; and a magnet bracket provided on an internal surface of said cartridge cover in alignment with said magnet, whereby said magnet attracts said magnet bracket when the cartridge cover is closed relative to the front panel, thus holding the cartridge cover in the closed position.

6. The magnetic recording and reproducing apparatus with game pack driver according to claim 1, wherein a top section of the front panel is provided with an eject means for facilitating ejection of the cartridge cover by urging the cartridge cover to the opened position.

7. Magnetic recording and reproducing apparatus with game pack driver, wherein said game pack driver comprises:

a main body;

a front panel connected to the main body;

a game pack receiving means located on the front panel for receiving and holding a game pack in communication with the game pack driver to provide easy loading and unloading of a game pack even when the main body other than the front panel may be otherwise confined; and said game pack receiving means including
a block door having a game pack socket, said block door being movably positioned in an opening within the front panel such that the block door moves linearly between a forward position at which the game pocket is positioned outside the main body and a backward position at which the game pack pocket is positioned within the main body relative to the front panel.

8. The magnetic recording and reproducing apparatus with game pack driver according to claim 7, wherein said block door includes:
   a printed circuit board mounted to surface of said block door;
   said game pack socket being mounted to an exposed surface of said printed circuit board; and
   a pair of guide ribs for guiding insertion of a game pack into said game pack socket, said guide ribs extending from opposed sides of said socket.

9. The magnetic recording and reproducing apparatus with game pack driver according to claim 7, further comprising door guide means for guiding the linear movement of said block door relative to the front panel, said door guide means comprising:
   a pair of guide rails mounted inside the said main body and adjacent to opposing side surfaces of the block door; and
   a pair of guide grooves provided on opposed side surfaces of said block door and engaged with said guide rails of the main body respectively to guide said block door between closed and open positions.

10. The magnetic recording and reproducing apparatus with game pack drive according to claim 7, further comprising:
    door locking and ejecting means for locking the block door at a predetermined position substantially inside the interior of said main body and for ejecting a portion of the block door from the interior of the main body to a predetermined position substantially outside the interior of the main body.

11. The magnetic recording and reproducing apparatus with game pack driver according to claim 10, wherein said door locking and ejecting means includes:
    a push button having a hook in its rear section, said push button being pivoted to an internal surface of the front panel such that the front end of the push button projects out of a button hole of the front panel;
    a guide protrusion and a stop protrusion, said protrusions being provided on a top surface of a side wall of said block door and cooperating with the hook of said push button so as to prevent sudden ejection of the block door; and
    a first biasing member biasing forward the back of said block door so that the block door is elastically ejected from the main body when the push button is pushed and releases the stop protrusion of the block door from the hook of the push button.

12. The magnetic recording and reproducing apparatus with game pack driver according to claim 11, wherein said first biasing member is fitted over a spring holder shaft mounted to an internal surface of a main frame of the main body, and a predetermined portion of a rear section of said block door is provided with a shaft insert hole for receiving the spring holder shaft therein.

13. The magnetic recording and reproducing apparatus with game pack driver according to claim 11, wherein said first biasing member is a compression coil spring.

14. The magnetic recording and reproducing apparatus with game pack driver according to claim 11, wherein said push button is biased by a second biasing member at its pivot portion.

15. Magnetic recording and reproducing apparatus with game pack driver, wherein said game pack driver comprises:
    a main body;
    a front panel connected to the main body;
    a game pack receiving means located on the front panel for receiving and holding a game pack in communication with the game pack driver to provide easy loading and unloading of a game pack even when the main body other than the front panel may be otherwise confined, and said game pack receiving means including
    a game pack receiving door pivotally mounted to the front panel such that said door turns relative to an opening in the front panel for receiving a game pack inserted through the door; and
    a game pack socket provided at a predetermined position within the interior of said main body and in alignment with the game pack receiving door,
    whereby a game pack is received in said game pack socket when inserted through said game pack receiving door.

16. The magnetic recording and reproducing apparatus with game pack driver according to claim 15, wherein said game pack receiving door is biased by a biasing member at its pivot portion.

17. The magnetic recording and reproducing apparatus with game pack driver according to claim 15, wherein said game pack socket is mounted to a printed circuit board, said primed circuit board having a pair of guide ribs for guiding insertion of a game pack into said socket, said guide ribs extending from said printed circuit board at opposed sides of said socket.

18. The magnetic recording and reproducing apparatus with game pack driver according to claim 17, wherein all of said printed circuit board, said game pack socket and said guide ribs are placed in said main body such that they are inclined with respect to the front panel.

19. The magnetic recording and reproducing apparatus with game pack driver according to claim 15, further comprising a stop means for limiting the pivotal motion of the game pack receiving door in the closed position such that the combination of the game pack receiving door and the socket form a tape receiving channel for guiding the movement of the game pack.

* * * * *